United States Patent [19]

Armstrong

[11] Patent Number: 4,842,467
[45] Date of Patent: Jun. 27, 1989

[54] CONCRETE SCREW

[75] Inventor: William D. Armstrong, Grapevine, Tex.

[73] Assignee: Yamashina Seiko-sho, Ltd., Japan

[21] Appl. No.: 118,055

[22] Filed: Nov. 9, 1987

Related U.S. Application Data

[63] Continuation of Ser. No. 643,725, Aug. 24, 1984.

[51] Int. Cl.⁴ .................. F16B 23/00; F16B 35/06
[52] U.S. Cl. ............................ 411/399; 411/417; 411/386
[58] Field of Search .......... 411/386, 387, 411, 414, 411/417, 418, 419, 420, 421, 422, 424, 426, 399

[56] References Cited

U.S. PATENT DOCUMENTS

| | | | |
|---|---|---|---|
| 1,526,182 | 2/1925 | Rosenberg | 411/411 |
| 2,096,937 | 10/1937 | McManus | 411/418 |
| 2,293,930 | 8/1942 | Braendel | 411/420 |
| 3,376,780 | 4/1968 | Tanczyn | 411/411 |
| 3,748,949 | 7/1973 | Dreger | 411/411 |
| 3,902,399 | 9/1975 | Yotti | 411/414 |
| 3,937,119 | 2/1976 | Ernst | 411/422 |
| 4,439,077 | 3/1984 | Godsted | 411/411 |

FOREIGN PATENT DOCUMENTS

| | | | |
|---|---|---|---|
| 2754870 | 6/1979 | Fed. Rep. of Germany | 411/411 |
| 2912924 | 10/1980 | Fed. Rep. of Germany | 411/411 |
| 739598 | 11/1932 | France | 411/411 |
| 2313588 | 12/1976 | France | 411/417 |
| 2461138 | 1/1981 | France | 411/399 |
| 2500090 | 8/1982 | France | 411/411 |
| 667051 | 2/1952 | United Kingdom | 411/417 |

*Primary Examiner*—Neill R. Wilson
*Attorney, Agent, or Firm*—Wigman & Cohen

[57] ABSTRACT

A self-tapping screw for use on concrete and masonry structures is disclosed. The screw has a helically threaded shank of uniform diameter. The crest diameter of the helical thread on the shank has a taper which increases gradually from the tip or entering end of the shank for a predetermined distance along the shank and then has a uniform diameter over the remaining portion of the helical thread. The helical threads have a spacing of 5-8 threads per inch for screw sizes in the range of ½ to 3/16 inch. Thread cutting notches are formed in the threads over at least the tapered portion thereof. The screw is hardened to a Rockwell "C" hardness of 48 or greater.

13 Claims, 1 Drawing Sheet

CONCRETE SCREW

This is a continuation of co-pending application Ser. No. 643,725 filed on Aug. 24, 1984.

BACKGROUND OF THE INVENTION

The present invention relates to self-tapping concrete screws and, more particularly, to a screw which may be readily tapped into a pre-drilled bore in a concrete or other masonry structure without danger of stripping the thread and with improved embedment for a given depth of penetration.

The term "concrete" as used herein is intended to include aggregate materials, such as gravel, pebbles, sand or the like in a mortar or cement matrix, as well as masonry materials, such as stone, brick, concrete block and the like.

As is readily apparent to those skilled in the art, a self-tapping screw offers many advantages over other types of concrete anchoring devices in terms of both the installation time involved and the additional cost of producing a complex anchoring structure.

Those seeking the advantages of a self-tapping screw for concrete structures have been constrained by the fact that the concrete material tends to crumble, chip and break off from the wall of the pre-drilled bore as the thread cutting elements of the screw engage and cut into the bore wall. As a consequence, a substantial amount of concrete dust and particulate matter are produced in the bore. As the screw becomes further embedded into the concrete workpiece, more and more chips and dust accumulate between adjacent threads until a point is reached at which the torque required to achieve additional penetration of the screw is greater than the shearing or twist-off torque of the screw. Such problems can occur after only a few rotations of the screw and can result in a portion of the twisted-off screw shank becoming embedded below the surface of the concrete structure making it extremely difficult to remove without irreparably damaging the pre-drilled bore. Even if the screw is fully embedded in the bore, the threads that are formed in the bore wall are of such poor quality that the holding power, i.e., the pull-out strength, of the screw is significantly diminished.

It has also been discovered that there is a problem associated with the use in concrete aggregate material of conventional self-tapping concrete screws heretofore available. When a bore is pre-drilled into the concrete aggregate material, it frequently occurs that the drilled bore passes through or closely adjacent a piece of aggregate or gravel having a hardness greater than the hardness of the screw threads. If that occurs, the thread-cutting elements of the screw are usually damaged to such an extent that the thread cutting capability of the screw is virtually destroyed. Thus, even if the screw is driven into the bore, the pull-out strength will be completely unsatisfactory.

A conventional self-tapping concrete screw in widespread use in the industry is disclosed in U.S. Pat. No. 3,937,119. The screw disclosed in that patent has dual threads of different crest diameters, known in the art as "hi-lo" threads. The function of the thread convolutions with the greater crest diameter is to cut into the wall of the pre-drilled bore and to provide the holding power of the screw. The thread convolutions with the smaller crest diameter correspond roughly to the diameter of the borehole. The smaller diameter thread is said to guide the screw shank straight down the borehole and to provide reservoirs or spaces in which the dust produced by the cutting action of the screw can accumulate without causing undue stress in the concrete material or shearing of the screw.

It should be readily apparent that if half the threads of a concrete screw function solely as a guide means or to provide gaps or spaces for dust collection, only the remaining half of the threads function to penetrate or tap the bore wall and hold the screw in place. Thus, the embedment or pull-out strength of such prior art screws will be substantially less than a screw having the same number of threads, all of which penetrate or tap the bore wall.

A further shortcoming of the conventional self-tapping concrete screw disclosed in the aforementioned patent is the stringent tolerance requirements for the pre-drilled bore diameter and, consequently, for the drill bit diameter tolerance. In order for the smaller crest diameter thread, i.e., the "lo" thread, to function as a guide and not as a thread-cutting element, the pre-drilled bore diameter must exactly correspond with the smaller crest diameter. Variations from correspondence of those diameters will either reduce the guiding effectiveness of the "lo" thread or permit the "lo" thread to engage the bore wall and cause crumbling or chipping of the wall.

Another drawback associated with the aforementioned patented screw is the "hi" or cutting thread which comprises a sharp and relatively "thin" thread convolution as measured in the axial dimension of the screw at the root of the cutting thread. Such a "thin" thread coupled with a relatively low hardness of the screw thread can result in collapsed or severely damaged threads, especially when the screw is used in concrete materials with particularly hard aggregate.

Another way in which the problem of dust particle collection has been dealt with in the prior art is disclosed in U.S. Pat. No. 3,902,399 wherein thread convolutions of different crest diameters are provided at different longitudinal portions of the screw shank. An intermediate longitudinal portion of the screw shank is provided with threads with a crest diameter smaller than the bore diameter or with no threads at all. The space provided between the bore and screw shank at such intermediate portion is said to accommodate the dust formed as the screw penetrates the concrete. Such a thread arrangement likewise reduces the pull-out strength for a given length of thread.

SUMMARY AND OBJECTS OF THE INVENTION

In view of the foregoing limitations and shortcomings of the prior art concrete screws, as well as other drawbacks and disadvantages not specifically mentioned above, it should be apparent that there still exists a need in the art for a self-tapping concrete screw which may be tapped into a pre-drilled bore in concrete without risk of shearing the screw or damaging the screw threads or the threads formed in the concrete and which provides an improved degree of embedment in the concrete structure and thus greater pull-out strength. It is, therefore, a primary objective of this invention to fulfill that need by providing a hardened, self-tapping concrete screw having a single, spaced thread with a relatively large pitch and a substantially uniform thread crest diameter, except for a predetermined longitudinal portion of the threads immediately adjacent the blunt leading end portion of the screw, which thread portion is tapered to a smaller crest diameter at the tip or entering end of the screw.

It is another object of the present invention to provide a self-tapping concrete screw in which substantially the entire surface area of all the threads of the screw engages the concrete material to thereby substantially increase the pull-out strength of the screw.

Another object of the invention is to provide a concrete self-tapping screw which is characterized by sufficiently hard threads of relatively large pitch so as to cut threads in a pre-drilled bore in concrete material with a minimum of damage to the thread and to the walls of the bore.

Yet another object of the present invention is to provide a self-tapping concrete screw which is designed to cut substantially the full thread depth in the concrete material with the leading end portion of the screw so that the majority of chips and dust formed by the thread cutting elements fall to the bottom of the pre-drilled bore rather than collect between the threads along the shank of the screw.

It is a further object of the invention to provide a self-tapping concrete screw which is suitable for use with power driving tools.

Briefly described, the aforementioned objects are accomplished according to the invention by providing a hardened self-tapping concrete screw with a single, spaced thread having a relatively large pitch equivalent to less than 10 threads per inch and a uniform thread crest diameter, except for an approximately one-inch portion of the screw as measured from the blunt leading end thereof which is provided with a taper of about 4-5% per inch of the maximum thread crest diameter.

The preferred number of threads for a ½ inch screw is about 5 threads per inch, for a ¼ inch screw about 7 threads per inch and for a 3/16 inch screw about 8 threads per inch. The threads are advantageously formed with a large axial dimension at the root of the thread convolutions and an acute angle between the thread flanks of about 60° so that the thread is more massive or "thicker" than the threads of conventional concrete self-tapping screws. Such "thicker" threads, especially when hardened, more effectively resist the forces tending to collapse or damage the threads when the screw is driven into hard concrete aggregate.

Thus, a ¼ inch screw advantageously has a pitch equivalent to no more than about 7 threads per inch. For a maximum crest diameter of about 0.245-0.250 inch, the crest diameter at the entering end of the screw for a 4% per inch taper would be about 0.235-0.240 inch. The screw is also advantageously heat treated to a Rockwell "C" hardness in the range of 48-60 and preferably 52-56.

The thread crests of the present screw are also provided with a plurality of V-shaped notches arranged about the thread convolutions. The notches provide sharp cutting surfaces to aid in cutting the threads in the concrete. The V-shaped notches may extend along the entire axial length of the thread convolutions, however, they are most effective along the threads at the tapered leading end of the screw inasmuch as the majority of the thread cutting is performed by the tapered leading end of the screw. As a result, most of the dust and chips generated by the thread cutting elements of the screw fall to the bottom of the pre-drilled bore and, thus, do not interfere with the screw driving operation.

In addition, because there is no need to provide additional spaces along the shank of the screw to accommodate an excessive amount of dust and chips, the root diameter of the thread, which corresponds to the shank diameter, can be designed with a closer tolerance or fit to the minimum tolerance bore diameter. Such closer fit provides a greater contact area for the thread and greater pull-out strength.

The portion of the shank between the screw head and thread convolutions is formed as a tapered frusto-conical portion having an included angle of about 15°-20° to increase the twist-off strength of the shank at the screw head. The frusto-conical portion also functions as a torque brake which helps to compensate for operator error and prevent overdrive of the screw.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
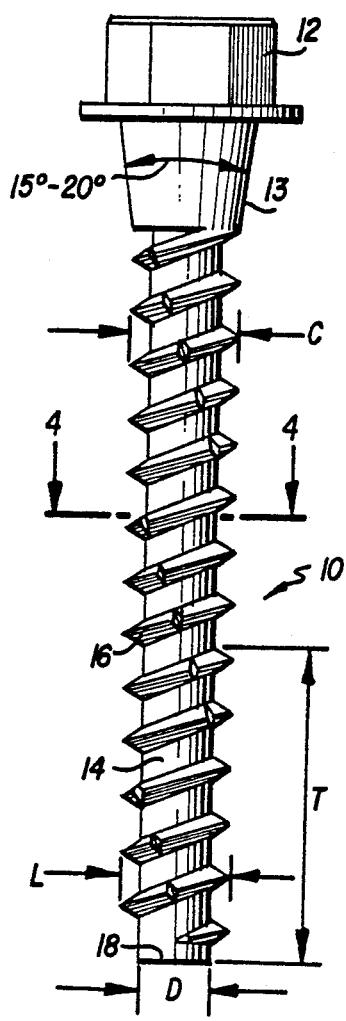
FIG. 1 is a side elevational view of a self-tapping screw embodying the present invention.

Referring now in detail to the drawing, the self-tapping concrete screw of the invention is designated generally by reference numeral 10. Screw 10 is provided with a hex washer head 12, it being understood that any other suitable head design may be used, such as a Phillips flat head or slotted hex washer head.

Screw 10 has a uniform diameter shank 14 which corresponds to the root diameter D of the spaced thread 16. The portion of the screw shank between the head 12 and the thread convolutions comprises a frusto-conical portion 13 having an included angle of preferably about 15°-20°. The crest diameter C of thread 16 is substantially uniform along the axial length of the screw from the frusto-conical portion 13 to a point spaced approximately one-inch from the entering blunt end 18 of the screw 10. The leading axial end portion of the screw thread 16 is tapered toward the end 18 over the dimension T which, as previously indicated, is approximately one-inch. The preferred taper amounts to about 4-5% per inch. Thus, for a ¼ inch screw having a thread crest diameter C of about 0.245-0.250 inch, the thread crest diameter L at the entering blunt end 18 of the screw will be about 0.235-0.240 inch.

Figure 4:
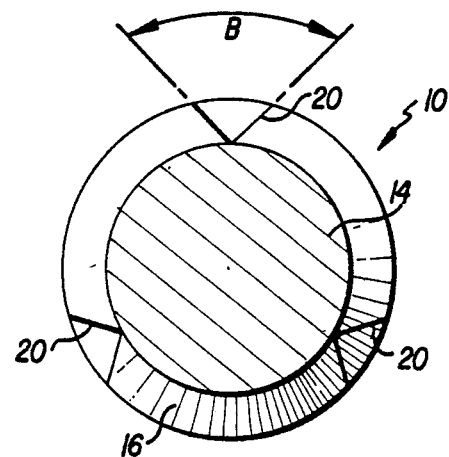
FIG. 4 is a cross-sectional view taken along the line 4—4 of FIG. 1.

To facilitate cutting of the concrete, the thread 16 is provided with three longitudinal series of V-shaped notches 20 cut into the crest thereof. The notches preferably have an included angle B of from about 90° to about 120° (FIG. 4). Each series of notches is arranged at approximately 120° with respect to one another and at an inclination relative to the screw axis, as best seen in FIG. 1.

Although the notches 20 are shown extending along the entire length of the thread convolution, the notches provided in the threads of the tapered leading portion T function to cut substantially the entire thread in the concrete. Accordingly, the axial portion of the threads which is provided with notched threads may be limited to an axial length equal to or slightly greater than the dimension T.

The pitch of the thread 16 is substantially greater than the standard pitch of conventional self-tapping spaced screw threads, such as the B, BP, BF and BT threads. For example, a ¼ inch self-tapping screw according to the present invention has about 7 threads per inch as compared to 14 threads per inch for standard 1¼ inch B, BP, BF and BT threads. A ½ inch screw according to the invention has about 5 threads per inch whereas the standard B, BP, BF and BT threads have 10 threads per inch. Thus, the pitch of the screw threads of the present invention is approximately twice that of conventional self-tapping spaced screw threads. (Data for conventional B, BP, BF and BT self-tapping threads from Marks' Standard Handbook for Mechanical Engineers, 8th ed. (1978) at pp. 8-26 to 8-27).

One significant advantage of the greater pitch or spacing of the screw threads according to the present invention is that substantial axial portions of the bore walls in the concrete aggregate between adjacent threads remain undisturbed and undamaged by the screw threads. More closely spaced threads create a greater risk of damage, crumbling and breakage of the wall portions between the threads.

Figure 2:
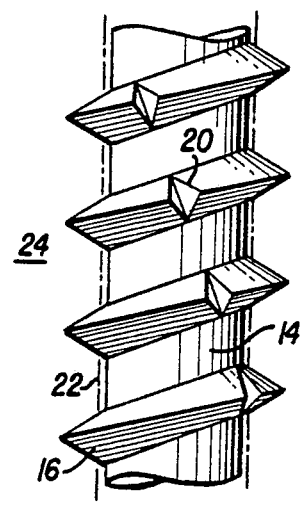
FIG. 2 is an enlarged fragmentary side elevational view of the screw.
Figure 3:
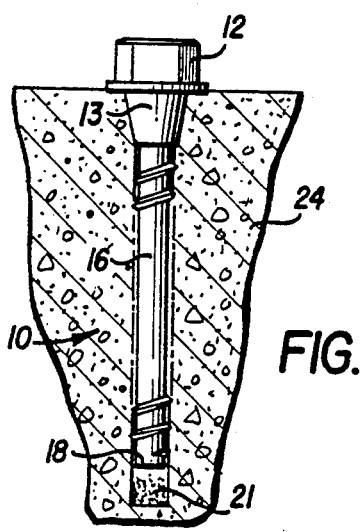
FIG. 3 is a side elevational view showing the screw embedded in a concrete structure.

As shown in FIG. 2, the diameter D of the screw shank 14 is slightly smaller than the diameter of the pre-drilled bore 22 in the concrete structure 24 to accommodate the tolerance ranges between the bore and shank diameters. However, unlike the prior art screws discussed above, only a relatively small circumferential space between the shank 14 and bore 22 is required because the majority of dust and chips are generated by the leading end portion of the screw and fall to the bottom of the bore as indicated at reference numeral 21 in FIG. 3.

In the manufacture of the concrete screw of the invention, after the thread-forming and notch-cutting operations are completed, the screw 10 is heat treated to a relatively hard condition of preferably about Rockwell "c" 52-56 which is substantially greater than the typical hardness of the prior art screws. Although the most preferred range of hardness of the screw of the present invention is about Rockwell "C" 52-56, a range of hardness of Rockwell "C" 48-60 may be used, the higher hardness being most suitable for concrete aggregate and the lower hardness being most suitable for concrete block, cement and brickwork.

A preferred material for the concrete screw of the invention is AISI 1022 steel or a steel alloy having a higher carbon content, such as AISI 1035 steel. The steel alloy must be capable of being heat treated to a hardness of at least Rockwell 'C' 48 without embrittlement. Other types of tool steel may also be used so long as the properties of the steel permit hardening of the steel and avoid embrittlement.

Although only a preferred embodiment is specifically illustrated and decribed herein, it will be appreciated that many modifications and variations of the present invention are possible in light of the above teachings and within the purview of the appended claims without departing from the spirit and scope of the invention.

What I claim is:

1. A self-tapping anchoring concrete screw in a pre-drilled bore in a concrete structure having individual concrete aggregate components comprising a driving head and a tip, a shank portion extending between said head and tip, said shank portion having a substantially constant diameter and only one spaced, helical thread formed thereon, said helical thread having an intermediate thread portion with a substantially constant thread crest diameter and a leading end portion extending from the tip axially toward the intermediate thread portion for a predetermined distance, said shank portion including a frusto-conical portion extending between said head and the intermediate thread portion, said frusto-conical portion having a greater diameter adjacent the head, the thread crest diameter of the leading end portion being approximately 0.250 inches and tapering from a first diameter at the tip to a second, greater diameter at said predetermined distance, said screw having 8 or less threads per inch, said helical thread having a plurality of thead cutting notches formed therein over at least said predetermined distance from said tip, said helical thread having a surface hardness of at least Rockwell "C" whereby damage to the helical thread by the individual concrete aggregate components is substantially prevented.

2. An anchoring screw according to claim 1, wherein said screw has 7 threads per inch.

3. An anchoring screw according to claim 1, wherein said predetermined distance is about one-inch.

4. An anchoring screw according to claim 1, wherein the taper of the threads of the leading end portion is 4-5% per inch.

5. An anchoring screw according to claim 1, wherein the surface hardness of the helical thread is in the range of Rockwell "C" 52-56 and the thread spacing is 7 threads per inch.

6. An anchoring screw according to claim 5, wherein said screw is formed of AISI 1022 steel alloy.

7. An anchoring screw according to claim 1, wherein the flanks of the helical thread form an acute angle of about 60°.

8. An anchoring screw according to claim 1, wherein the tip of the screw is blunt.

9. An anchoring screw according to claim 1, wherein the leading end portion comprises 5-8 threads.

10. A self-tapping anchoring concrete screw in a pre-drilled bore in a concrete structure having individual concrete aggregate components comprising a driving head and a tip, a shank portion extending between said head and tip, said shank portion having a substantially constant diameter and only one spaced, helical thread formed thereon, said helical thread having an intermediate thread portion with a substantially constant thread crest diameter and a leading end portion extending from the tip axially toward the intermediate thread portion for a predetermined distance, said shank portion, the thread crest diameter of the leading end portion being approximately 0.250 inches and tapering from a first diameter at the tip to a second, greater diameter at said predetermined distance, said screw having 8 or less threads per inch.

11. An anchoring screw according to claim 10, wherein said helical thread has a surface hardness of at least Rockwell "c" 48 whereby damage to the helical thread by the individual concrete aggregate components is substantially prevented.

12. An anchoring screw according to claim 10, wherein said screw has 7 threads per inch.

13. An anchoring screw according to claim 11, wherein said surface hardness is in the range of Rockwell "C" 52-56.

* * * * *

UNITED STATES PATENT AND TRADEMARK OFFICE
CERTIFICATE OF CORRECTION

PATENT NO. : 4,842,467
DATED : June 27, 1989
INVENTOR(S) : William D. ARMSTRONG

It is certified that error appears in the above-identified patent and that said Letters Patent is hereby corrected as shown below:

IN THE SPECIFICATION:

Column 5, line 12, "1 1/4 inch" should be --1/4 inch--;
line 44, ""c" 52-56" should be --"C" 52-56--;
line 55, "'C' 48" should be --"C" 48--.

IN THE CLAIMS:

Claim 1, column 6, line 20, ""C" should be --"C" 48--.

Claim 5, line 3, ""C" 52-56and" should be --"C" 52-56 and--.

Claim 11, line 3, ""c" 48" should be --"C" 48--.

Signed and Sealed this

Seventeenth Day of April, 1990

Attest:

HARRY F. MANBECK, JR.

Attesting Officer     Commissioner of Patents and Trademarks